United States Patent [19]

Kurokawa et al.

[11] Patent Number: 5,195,024

[45] Date of Patent: Mar. 16, 1993

[54] PROGRAMMABLE CONTROLLER

[75] Inventors: Naohiro Kurokawa, Shibata; Yasusuke Sakurai, Nakajou, both of Japan

[73] Assignees: Hitachi, Ltd.; Hitachi Techno Engineering Co., Ltd., both of Tokyo, Japan

[21] Appl. No.: 531,153

[22] Filed: May 31, 1990

[30] Foreign Application Priority Data

Jun. 2, 1989 [JP] Japan .................. 1-139037

[51] Int. Cl.⁵ ............................................. G05B 19/05
[52] U.S. Cl. ...................................... 364/140; 364/143; 364/578; 371/19
[58] Field of Search ............... 364/140, 141, 143, 146, 364/578, 580; 371/19, 25.1; 328/71, 75; 340/514, 515, 516

[56] References Cited

U.S. PATENT DOCUMENTS

| | | | |
|---|---|---|---|
| 3,829,842 | 8/1974 | Langdon et al. | 364/143 |
| 4,298,958 | 11/1981 | Takaki et al. | 371/19 |
| 4,616,306 | 10/1986 | Kuzuma et al. | 364/140 |
| 4,783,762 | 11/1988 | Inoue et al. | 364/144 |
| 4,827,396 | 5/1989 | Taniguchi | 364/140 |

Primary Examiner—Jerry Smith
Assistant Examiner—Paul Gordon
Attorney, Agent, or Firm—Antonelli, Terry, Stout & Kraus

[57] ABSTRACT

Disclosed herein is a programmable controller comprising a central processing unit (CPU) and a delay element. The CPU operates on simulated input information in accordance with a sequence program. The result of the operation by the CPU is sent to the delay element. The delay element in turn supplies the operational result with a delay time setting and feeds the result back to the CPU as simulated input information. The delay element is also capable of setting any delay time for simulation as desired.

7 Claims, 8 Drawing Sheets

FIG. 3(a)
| ADDRESS | | |
|---|---|---|
| 1001 | LOAD | Y50 |
| 1002 | OUT I | 10 |
| 1003 | 0.5 | |
| 1004 | LOAD | Y51 |
| 1005 | OUT I | 03 |
| 1006 | 0.03 | |
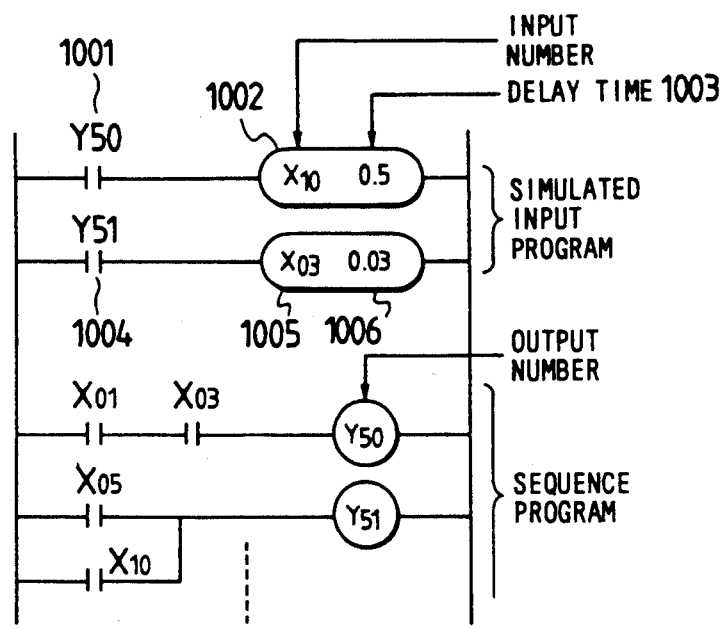
FIG. 3(b)
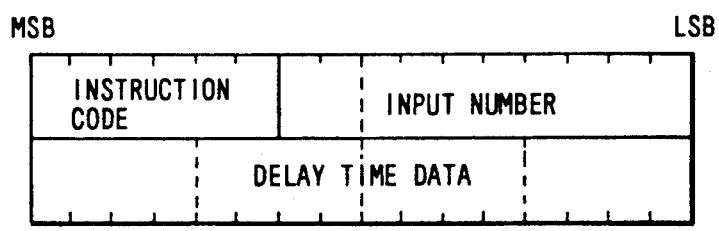
FIG. 4(a)
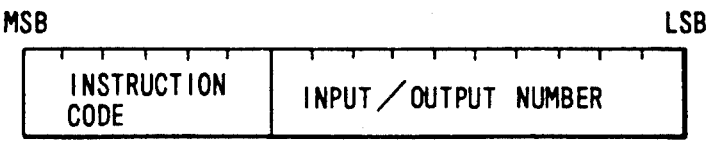
FIG. 4(b)

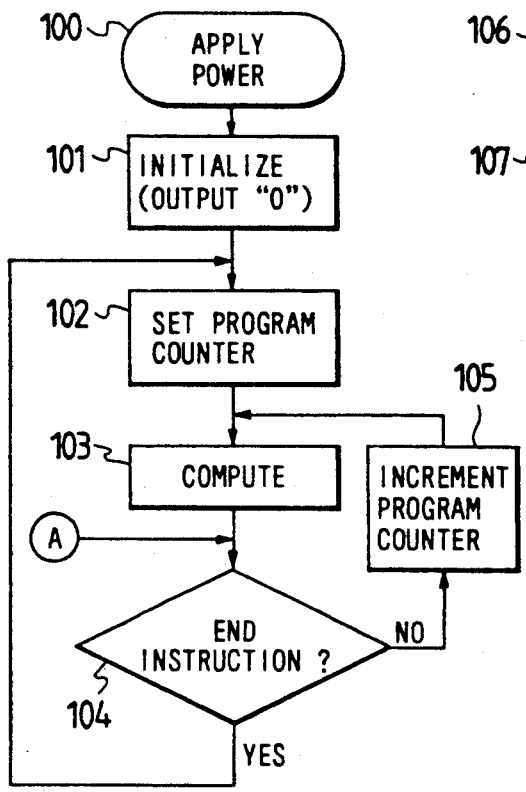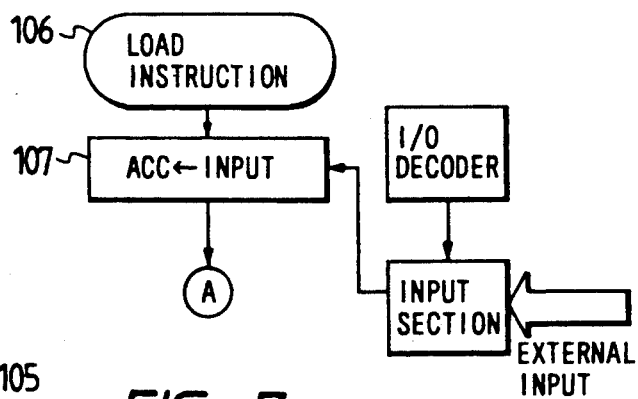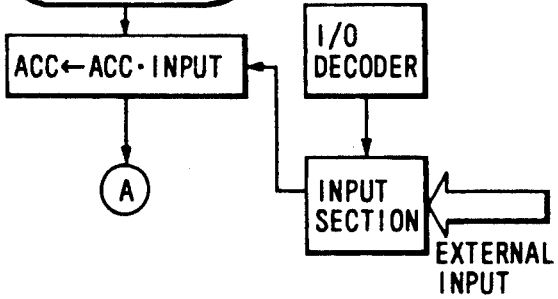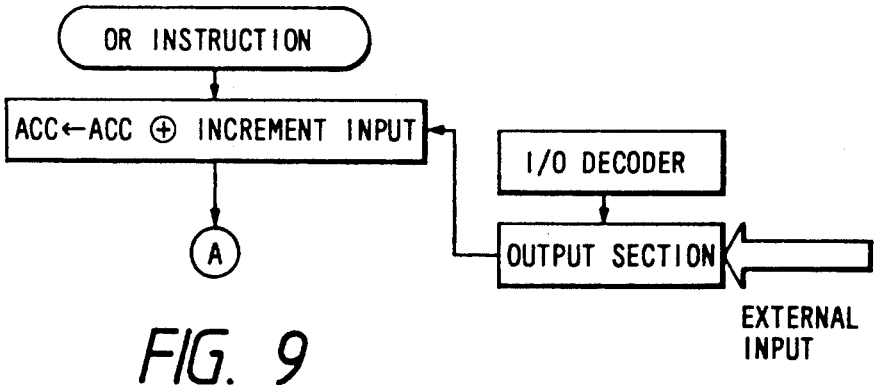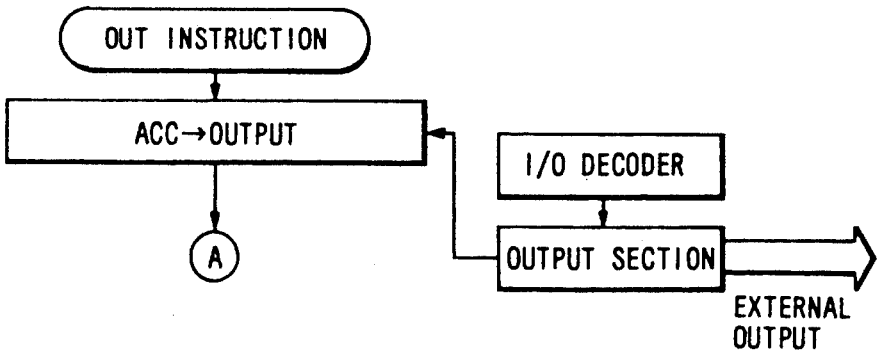

PROGRAMMABLE CONTROLLER

BACKGROUND OF THE INVENTION

The present invention relates to a programmable controller that simulates a program in response to simulated inputs.

Generally, a programmable controller is connected to input devices, such as sensors and limit switches, as well as to external loads, such as valves and motors to be controlled. The steps required for control of the target equipment are compiled beforehand as a program that is incorporated in the controller.

Programming errors, if left undetected, may prevent the controller from providing the kind of control desired. It is therefore general practice to simulate the program for checkup before the actual operation is attempted.

FIG. 16 (a) shows a prior art example of the simulating of a program run with a programmable controller. In this figure, a programmable controller 1 is connected to an external load (device) 3 and to a limit switch 2a that operates in conjunction with the internal load. In actual operation, a driving output signal from the programmable controller 1 activates the external load 3. The limit switch 2a operates a certain period of time after the starting of the operation. Instead of having these actions actually carried out, which can be dangerous because of the unpredictability involved, the arrangement in FIG. 16 uses an externally prepared input switch 2' for testing that is manually operated for program simulation by use of the programmable controller alone.

One disadvantage of the prior art arrangement outlined above is the need to prepare and add the input switch 2' every time a simulation is to be performed. A prior art solution to this problem is to incorporate the input switch 2' in the programmable controller, as disclosed in Japanese Patent Laid-open No. 56-85104. Another prior art solution is to program beforehand the number of the input switch to be tested and to refer to the number during simulation, as disclosed in Japanese Patent Laid-open No. 63-21900. The latter setup eliminates the need for the input switch for testing.

These two prior art solutions share a major disadvantage: that it is impossible to simulate the execution of a sequence program that would allow for a precise delay time between the time the external load starts functioning and the time the appropriate limit switch is activated, as illustrated in FIG. 16 (b). With the first prior art solution, as mentioned above, in which the input switch for testing is externally attached, as shown in FIG. 16 (a), the switch needs to be operated manually. This means it is impossible to operate the switch for strict timing requirements. With the second prior art solution in which the number of the input switch for testing is preprogrammed, the stored program contents are input immediately, thus making it impossible to meet the timing requirements allowing for the delay time involved.

As indicated, it is impossible for sequence programs in which the delay time is controlled to verify through simulation whether or not the programmed contents are correct.

SUMMARY OF THE INVENTION

It is therefore an object of the present invention to provide a programmable controller which is capable of performing simulations which represent actual operations allowing for a delay time between the time the load is applied and the time the appropriate limit switch reacts to it.

It is another object of the present invention to provide a programmable controller whereby the delay time between load activation and limit switch reaction may be set freely for simulation.

To achieve the foregoing and other objects in accordance with the purposes of the present invention, as embodied and broadly described herein, there are provided an input section, a memory, a central processing unit (CPU) and a delay element. The input section receives input information about the target load to be controlled. The memory stores a sequence program. Connected to these components, the CPU carries out operations in accordance with the sequence program. The delay element, connected to the CPU, has a predetermined delay time set thereto. During simulation, the result of the operation by the CPU is turned into an input signal that takes on the delay time when passing through the delay element before the signal is fed back to the CPU.

The delay element has the ability to count not just the delay time, but the time that has elapsed since the CPU gave the result of its operation. A comparison is made between the elapsed time counted by the delay element on the one hand, and the delay time established in a simulated input program in memory on the other. At the proper timings based on the comparison, the current result of the operation by the CPU is regarded as an appropriate input signal that is fed back to the CPU.

The delay element provides the operational result it received with the delay time that was set during simulation, and feeds back the outcome thereof to the CPU. Using its counting ability, the delay element compares the time it counted with the delay time established in the simulated input program. At the proper timings, the current operational result is fed back to the CPU. In this manner, the proper delay timings can be set for simulation purposes.

BRIEF DESCRIPTION OF THE DRAWINGS

FIGS. 3(a) and 3(b) are views showing how the program of the first embodiment operates;

FIGS. 4(a) and 4(b) are views of instruction formats showing how an operation code for the first embodiment is constructed;

FIG. 5 is a flowchart outlining the entire series of the operations involved with the first embodiment;

FIG. 6 is a flowchart showing how a LOAD instruction is executed;

FIG. 7 is a flowchart illustrating how an AND instruction is execute;

FIG. 8 is a flowchart showing how an OR instruction is executed;

FIG. 9 is a flowchart depicting how an OUT instruction is executed;

DETAILED DESCRIPTION OF PREFERRED EMBODIMENTS

Figure 1:
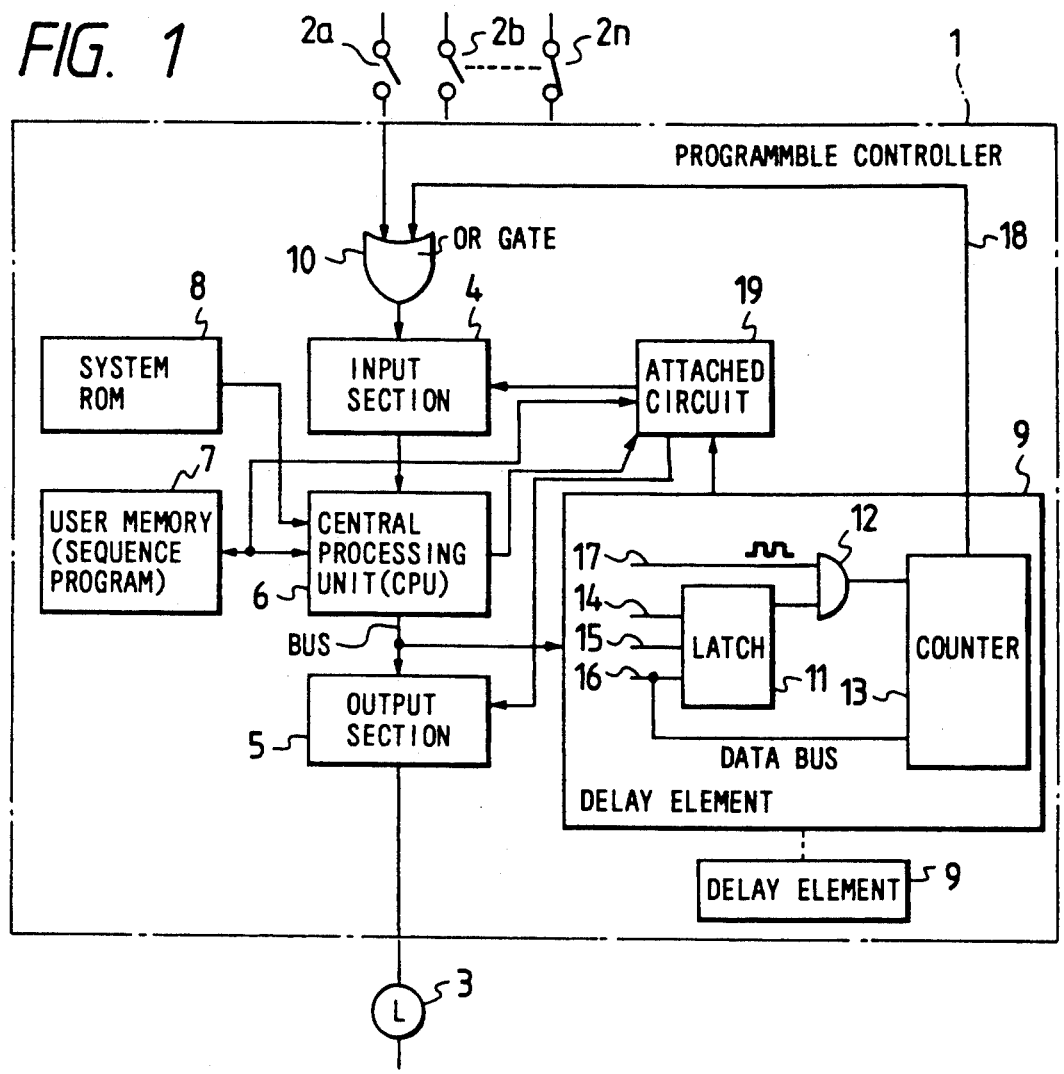
FIG. 1 is a block diagram of a first embodiment of the present invention.

The first embodiment of the present invention will now be described by referring to FIGS. 1 through 10. FIG. 1 is a block diagram showing the entire construction of the first embodiment. In the figure, reference numeral 1 indicates a programmable controller; numerals 2a, 2b, ... 2n indicate a plurality of external input devices i.e., objects to be controlled; numeral 4 indicates an input section that removes chattering and other disturbances from each of a plurality of input signals (input information) coming from the external input devices; numeral 6 indicates a CPU (central processing unit) that performs operations according to the contents of a sequence program; and numeral 5 indicates an output section that informs an external load 3 of the result of the operation by the CPU. Reference numeral 7 indicates a user RAM (memory) that contains beforehand the sequence program and a simulated input program. Numeral 8 indicates a ROM (read only memory) that stores a system program for effecting comprehensive control over the above-mentioned elements. Numerals 9 and 10 indicate a delay circuit (element) and an OR gate, respectively; they are each provided as many times as there are external input devices installed.

The delay circuit 9 comprises a latch element 11 that has a control signal line 15 connected to the CPU, a select signal line 14 and a data bus 16 through which the result of the operation (e.g., input number, delay time) by the CPU 6 is stored into the element 11. An AND gate 12 receives via a signal line 17 the output of the latch 11 and a pulse signal from an oscillator, not shown. The AND'ed output is used by the CPU 6 to set beforehand delay time data in a counter 13 by way of the data bus 16. The delay time data is decremented by 1 until the data reaches "0". At this point, a high-level signal "1" is output to a delay time output signal line 18. At the same time, decrementing of the counter is stopped. The delay time output signal line 18 is connected to a terminal of the OR gate 10.

Figure 2:
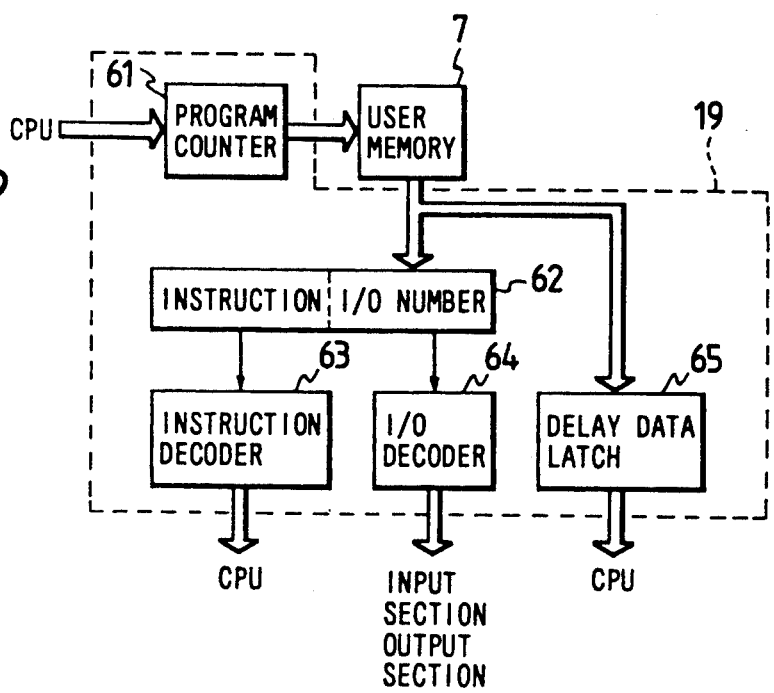
FIG. 2 is a block diagram of a circuit attached to the first embodiment.

FIG. 2 is a block diagram of an attached circuit 19 shown in FIG. 1. In FIG. 2, reference numeral 61 is a program counter for specifying a desired address in the user memory 7; numeral 62 is a latch that stores the contents (an operation code of an instruction and an I/O number) read from the user memory 7; numeral 63 is a decoder for decoding the operation code; numeral 64 is a decoder for decoding the I/O number; and numeral 65 is a latch that stores delay time data.

Referring to FIGS. 2 through 10, the first embodiment of the present invention, as constructed above, works as follows. FIG. 3 shows part of the contents of the user RAM 7. The contents comprise the simulated input program for generating simulated inputs during a simulation operation and the sequence program for actually executing and simulating the sequence involved. FIG. 3 (a) partially depicts the contents of the addresses in the user RAM 7, and FIG. 3 (b) illustrates the contents thereof in ladder format. In FIG. 3 (b), each of those parts of the simulated input program which are enclosed with an elongated circle (e.g., X10, 0.5) are defined as the output of the operational result directed at the input side. In the figure, X10 is an input number, and 0.5 is a delay time.

FIG. 4 defines the contents of FIG. 3 (a). The addresses 1002, 1003, 1005 and 1006 in FIG. 3(a) are of the format shown in FIG. 4 (a); the addresses 1001 and 1004 are of the format depicted in FIG. 4 (b). LOAD and OUT I in FIG. 3 (a) are each an instruction code; Y50 and Y51 are output numbers; 10 and 03 are input numbers; and 0.5 and 0.03 are delay time data. FIG. 4 (a) shows the part which creates the simulated input of the simulated input program, comprised of two words or four bytes. FIG. 4 (b) depicts parr of the simulated input program and the construction of each of the instructions in the sequence program.

The performance of the program shown in ladder format in FIG. 3 will now be described. In FIG. 5, power is applied in step 100. The system is initialized in step 101 and each output is turned off ("0" output). In step 102, the program counter 61 (FIG. 2) is initialized, which allows the start address of the user memory 7 (address 1001 in FIG. 3) to be specified. In step 103, the content of the user memory (operation code at address 1001) is read and operated on. Because its operation code is LOAD Y50, this instruction specifies that the on/off ("1" or "0") information of output Y50 be read out. This causes the process of FIG. 6 to be carried out. As shown in FIG. 6, the result (state of Y50) that was read out through the input section 4 under control of the I/O decoder 64 is stored in step 107 into a register ACC within the CPU 6.

Again in FIG. 5, a check is made in step 104 to see if the above-described processing is ended. If the processing is not ended, the program counter 61 is incremented in step 105 in order to read the contents of the next address (address 1002) in the user memory.

Figure 10:
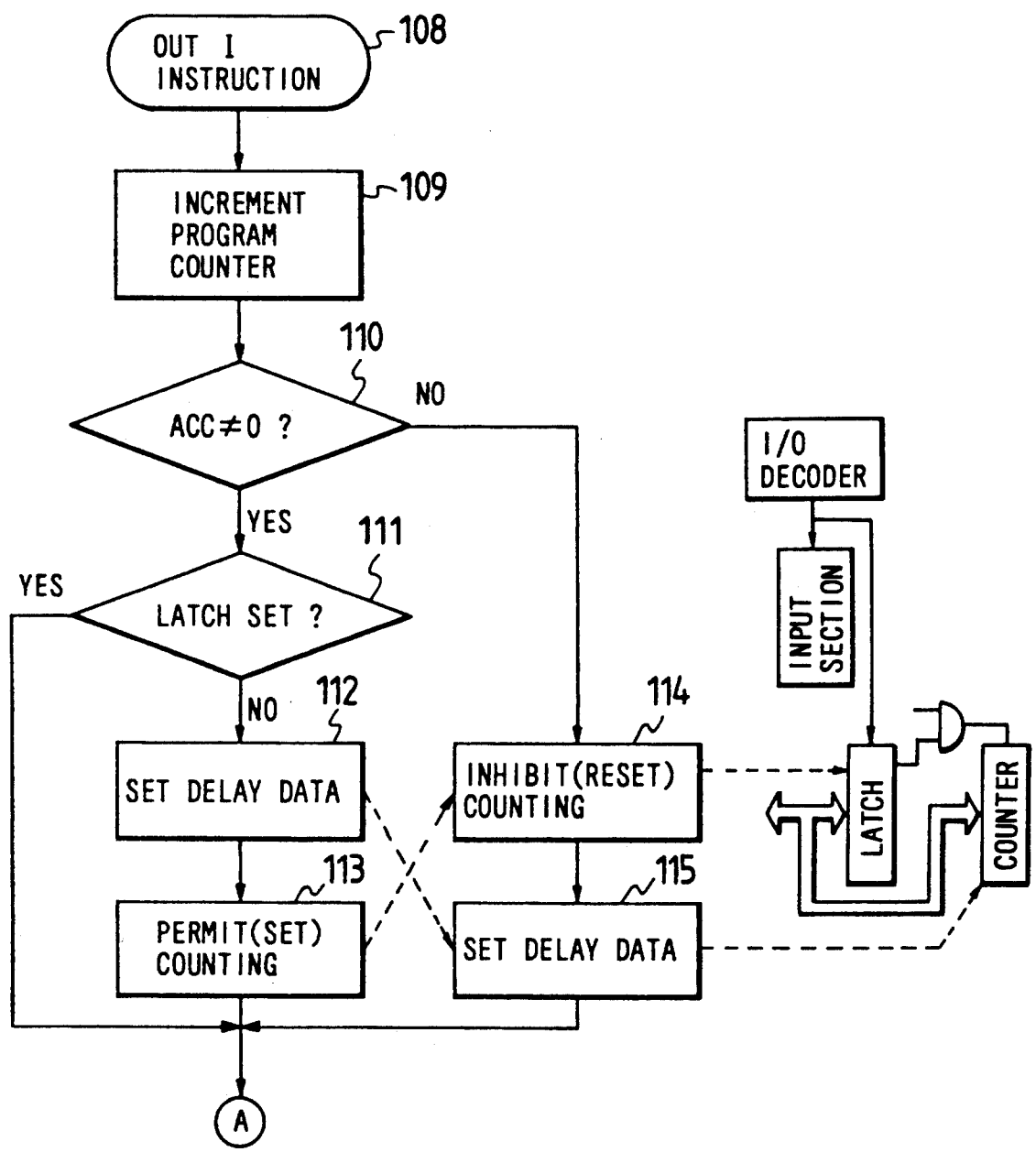
FIG. 10 is a flowchart showing how an OUT I instruction is executed.

In this case, the operation code at address 1002 is found to be OUT I, 10, which causes the OUT I instruction to be executed as per the flow in FIG. 10. The OUT I instruction is defined as an instruction that outputs an ON level following a period of time reflecting the stored delay time (0.5) if the result of the operation so far (contents stored in ACC) is at the ON ("1") level. Specifically, this instruction is executed as follows.

Referring to FIG. 10, in step 109, the program counter 61 is incremented and the delay time data (0.5) is read from address 1003 of FIG. 3. In step 110, a check is made on the contents of the ACC register. If the result is "1", the processing goes to step 111. In step 111, another check is made to see if the latch 11 in delay circuit 9 is set. If the latch 11 is not set, the delay time data (0.5) that was read earlier is set into the counter 13 of FIG. 1 in step 112. In step 113, the latch 11 is set to allow the decrementing to take place.

If it is found that the latch is set in step 111, nothing is done and process A of FIG. 5 is reached.

If the contents of the ACC are found to be "0" in step 110, the latch 11 is reset to inhibit the decrementing in step 114. The delay time data that was read out earlier is then set into the counter 13. With the delay time output signal line 18 set to "0" (turned off), the processing of FIG. 10 comes to an end.

The steps described above are repeated to let the simulated input program run. When the operational result corresponding to each input is retained in the appropriate latch, the sequence program performs its ordinary simulation.

Figure 16A:
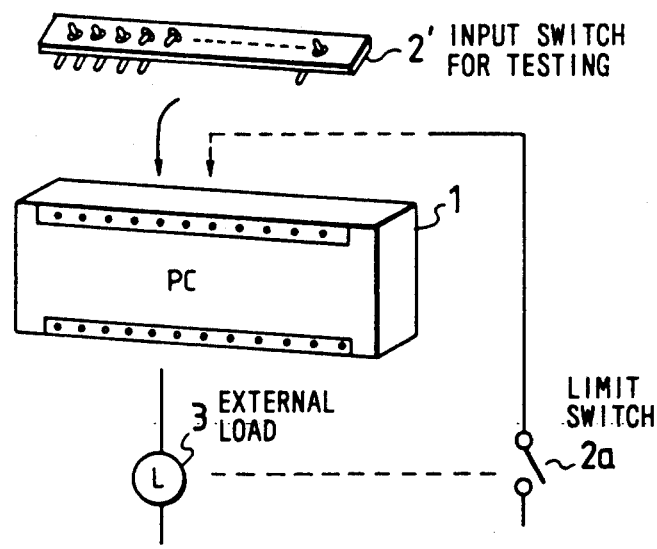
FIGS. 16(a) and 16(b) are views depicting prior art examples in connection with the present invention.
Figure 16B:
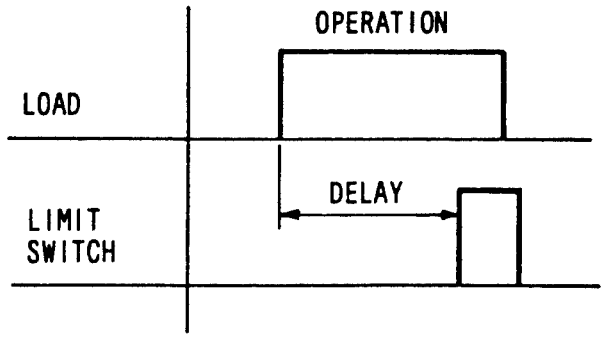

In FIG. 3, the on/off state of Y50 determined from the LAD instruction at address 1001 of the simulated input program is an outcome of the output of Y50 in the sequence program of the same figure in ladder format. The two kinds of Y50 in the two programs provide the relationship between the external load 3 and the contact 2a (limit switch) associated therewith in FIG. 16.

FIGS. 7, 8 and 9 illustrate other examples of how step 103 of FIG. 5 is carried out with AND, OR and OUT instructions, respectively.

The delay time is determined by the width of reference pulses generated by a pulse source (oscillator), not shown, from which the signal line 17 originates in FIG. 1. In the first embodiment, the delay time is set for 0.1 sec. Alternatively, the time may be set for 0.01 sec., 1 sec., etc. so as to vary the maximum delay time involved.

If the delay time data is set for "0", the result of the operation by the CPU may be given as an input with no delay time.

Figure 11:
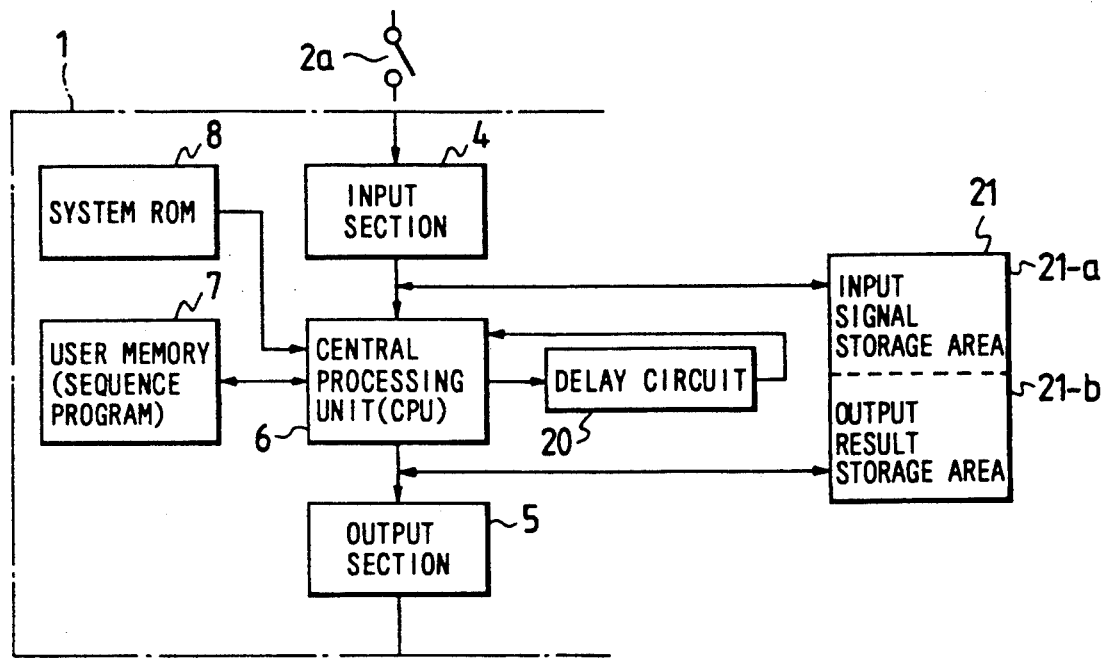
FIG. 11 is a block diagram of a second embodiment of the present invention.
Figure 12:
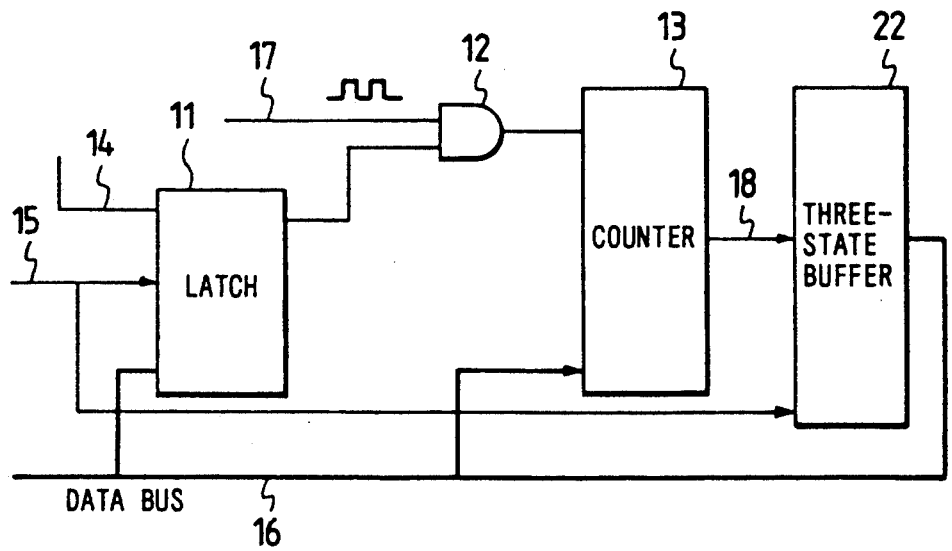
FIG. 12 is a block diagram of a delay circuit for use with the second embodiment of FIG. 11.

A second embodiment of the present invention will now be described by referring to FIGS. 11 and 12. In FIG. 11, what differs from FIG. 1 is the inclusion of a delay circuit 20 (delay element) and a storage section 21 that stores the result of the input signal output. A specific construction of the delay circuit 20 is shown in FIG. 12. In FIGS. 1 and 12, like reference characters designate like or corresponding parts. Reference numeral 22 is a three-state buffer to which the result counted by the counter 13 after the delay time is output. In the second embodiment, input signals from all external input devices are admitted by the system program through the input section 4 and the CPU 6 for storage into an input signal storage area 21-a of the storage section 21.

During execution of the simulated input program or sequence program, operations are carried out on the input signal contents stored as described above. The result of the operation is output to and stored in an output result storage area 21-b of the storage section 21. When the entire program execution is ended, the contents of the storage section 21 are output to the output section 5. As with the first embodiment, the second embodiment has as many delay circuits 20 as the number of inputs. The difference in this respect between the first and the second embodiments is that, as shown in FIG. 12, the result counted by the counter 13 after the delay time applied to the CPU 6 via the three-state buffer 21 and the data bus 16, the CPU thereafter outputting the result to the input signal storage area 21-a. That is, whereas the output from the delay circuit 9 is returned to the OR gate 10 in the first embodiment, the output therefrom in the second embodiment is returned via the CPU 6 to the input signal storage area 21-a.

A third embodiment of the present invention will now be described by referring to FIGS. 13 and 14. As with the second embodiment, the third embodiment involves having input signals from all external input devices stored via the CPU into an input signal storage area 25-a of a storage section 25. What differs from the second embodiment is that in the third embodiment, a single time counting section 26 is provided in place of the plural delay circuits of the first two embodiments.

Figure 13:
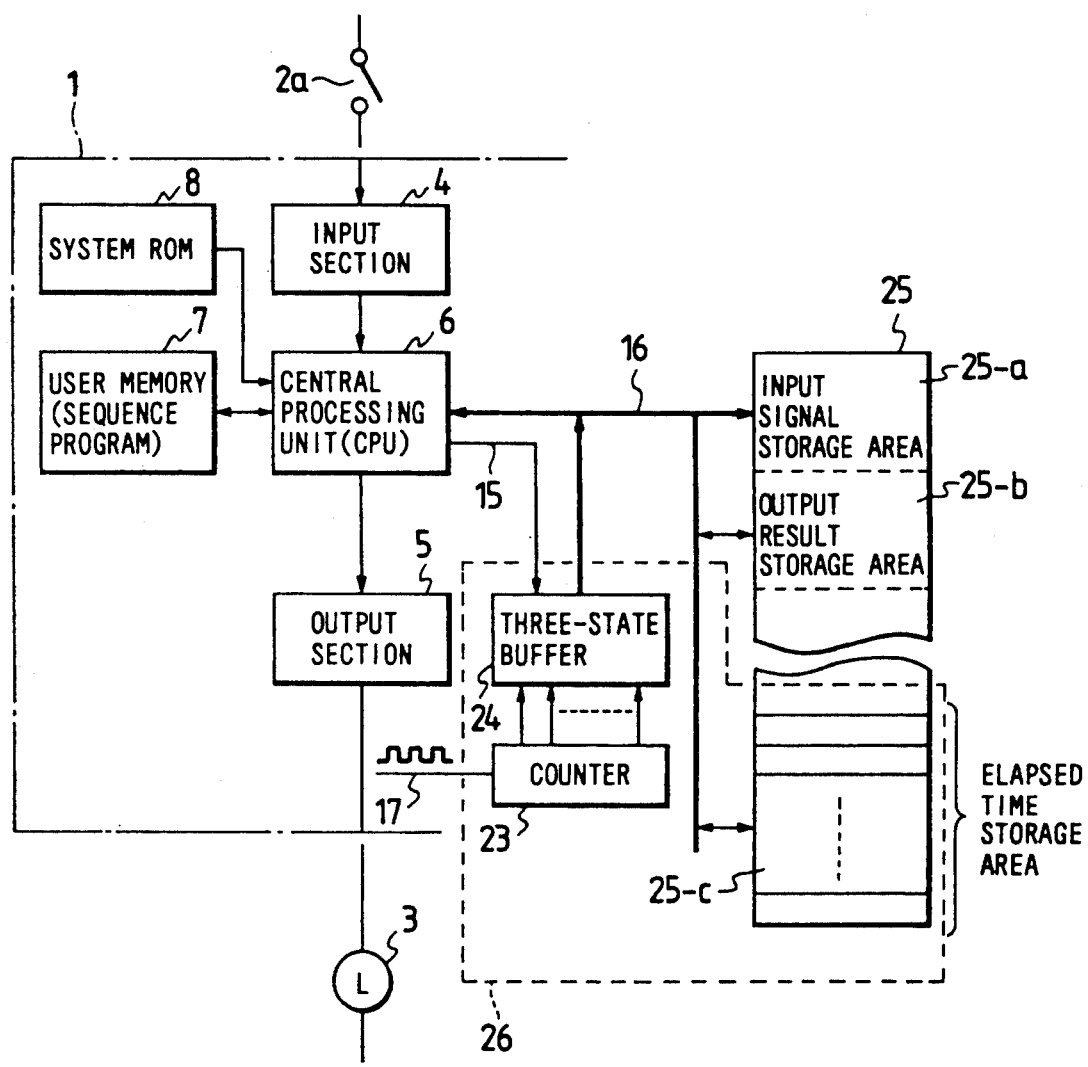
FIG. 13 is a block diagram of a third embodiment of the present invention.
Figure 15:
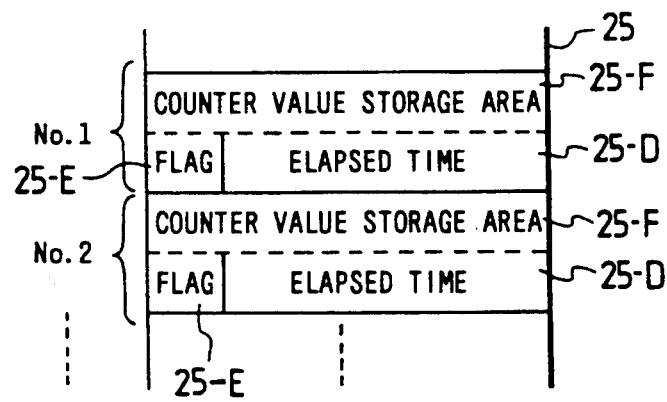
FIG. 15 is a detailed view of storage areas for use with the embodiments.

In FIGS. 13 and 1, like reference characters designate like or corresponding parts. In FIG. 13, reference numeral 23 denotes a counter that counts time in response to a pulse signal; numeral 24 denotes a three-state buffer that outputs the result coming from the counter 23 to the data bus 16; and numeral 25 denotes a storage section comprising an input signal storage area 25-a and an output result storage area 25-b corresponding to the areas 21-a and 21-b in FIG. 11, respectively. Reference characters 25-c designate an elapsed time storage area suitably located in the storage section 25. This area comprises a plurality of parts which are provided in a manner corresponding to the number of inputs (No. 1, No. 2, etc. in FIG. 15). As depicted in FIG. 15, each of these parts contains a counter value storage area 25-f, an elapsed time area 25-d, and a flag 25-e that indicates whether or not elapsed time data is stored; and the time counted by the counter 23 is stored as needed. Thus, the time counting section 26 contains the counter 23, the buffer 24 and the elapsed time storage area 25-c.

The time that has elapsed since the CPU 6 generated a "1" as a result of its operation is stored by the time counting section 26 into an area corresponding to the appropriate input device from which the current input signal was received. Then, a comparison is made between the elapsed time thus stored and the delay time data that is set in the operation code of the simulated input program in the user memory 7. When the delay time is reached, the appropriate input number is turned on. That is, the operational result mentioned above is output to the input signal storage area; and the "1" level is set.

Figure 14:
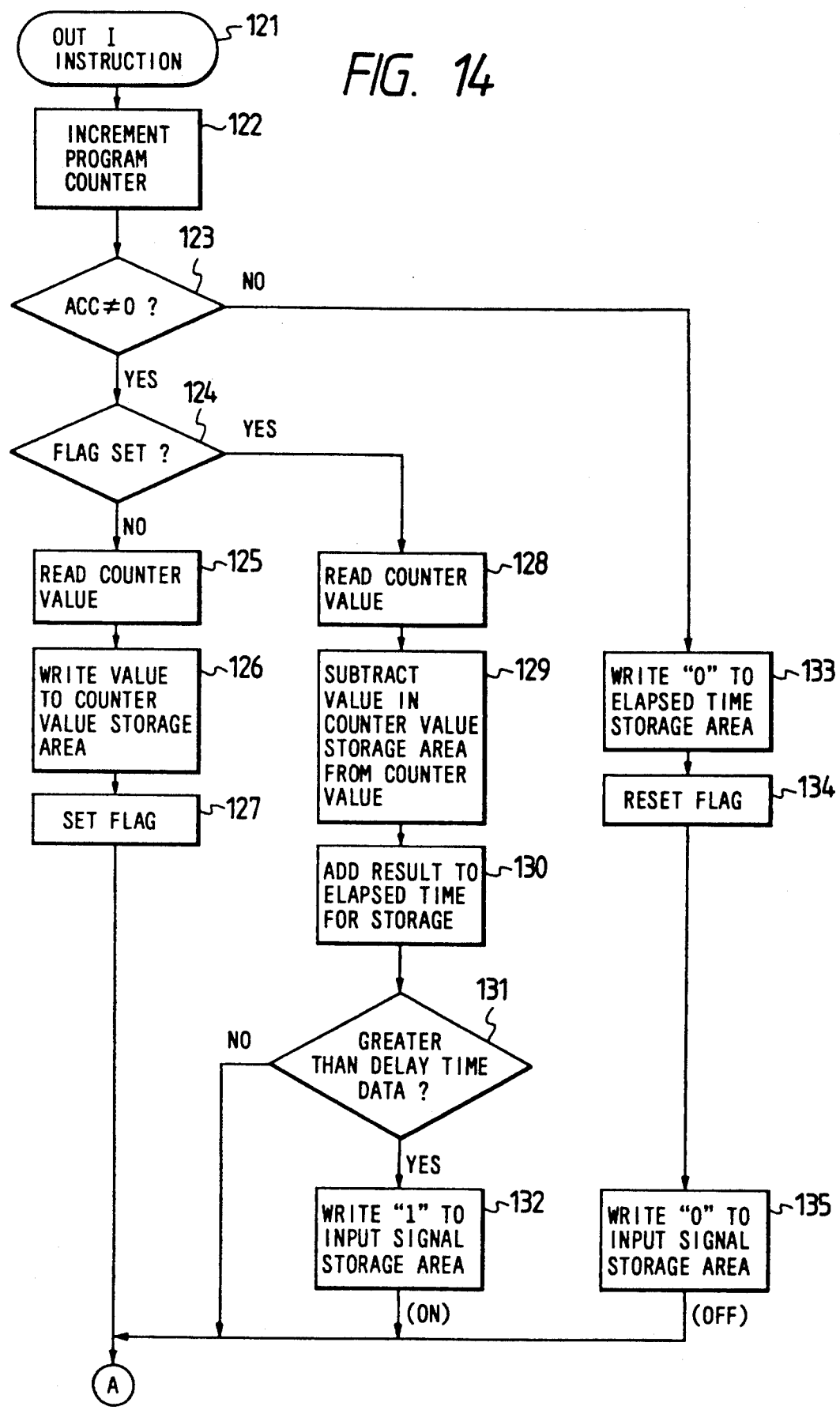
FIG. 14 is a flowchart illustrating how the third embodiment operates.

FIG. 14 illustrates the above-described process in flowchart format. In step 122, the program counter is incremented in order to read the delay time data. In step 123, a check is made on the operational result (value stored in the ACC) obtained so far. If the result is a "1", then a check is made in step 124 for a flag provided in the most significant bit of the elapsed time area 25-d in the elapsed time storage area 25-c. If the flag is not set, that means the output has not been measured for an elapsed time. In step 125, the value of the counter 23 is read via the three-state buffer 24. This value is written in step 126 into the elapsed time area 25-d corresponding to the appropriate input number (No. 1) in the counter value storage area 25-f. In step 127, the flag is set, and process A is reached again in preparation for the next operation code that requires another pass of processing to take place.

If the flag is found set in step 124, that means counting of the elapsed time has already begun. The counter value is read in step 128 via the three-state buffer 24. In step 129, the value previously stored in the counter value storage area 25-f is subtracted from the counter value. In step 130, the result of the subtraction is added to the preceding elapsed time, whereby the total time that has elapsed so far is computed and stored into the elapsed time area 25-d. In step 131, the total elapsed time is compared with the delay time data in the operation code of the simulated input program (simulation program). If the elapsed time is greater than the delay time data, a "1" is written in step 132 into the appropriate input signal storage area 25-a, and process A is reached again. It is to be noted that in step 128, the counter value is also updated and stored in the counter value storage area 25-f.

Meanwhile, in step 123, if the result of the operation so far is found to be a "0", then a "0" is written to the elapsed time storage area in step 133. In step 134, the flag is reset. In step 135, a "0" is written to the appropriate input, and process A is reached again. The flow between step 123 and process A is repeated cyclically until the computation involved is completed.

The elapsed time storage area 25-c, elapsed time area 25-d, flag 25-e, and counter value storage area 25-f are arranged as shown in FIG. 15. Each set of these parts corresponds to each of the inputs involved (No. 1, No. 2, etc.). The flag 25-e and the elapsed time area 25-d in fact reside in the same storage area. It is therefore necessary to mask the flag 25-e when the preceding elapsed time is added or compared. Alternatively, a dedicated storage area may be separately provided.

As indicated, a single time counting section provides simulation at timings finely tuned to allow the result of the operation to take on a delay time before being output to each necessary input section.

With the delay time data set for "0", signals with no delay time attached can be sent to the appropriate input section.

In the embodiments described above, signals with delay time settings are sent to the input section. Alternatively, the same arrangement may be applied to the output section.

The simulated input program (i.e., simulation program) is generally removed when simulation is completed. Alternatively, the program may be left untouched.

What is claimed is:

1. A programmable controller comprising:
   an input section for receiving input information from an object to be controlled;
   a first memory for storing a system program;
   a second memory for storing a sequence program and a simulated input program having delay time data set thereto;
   a central processing unit connected to said input section, said first memory and said second memory for selectively performing an operation in accordance with either one of said sequence program and said simulated input program;
   an output section connected to an output of said central processing unit for outputting a result of an operation performed by said central processing unit when said sequence program is performed;
   a delay element connected to an output of said central processing unit for causing a time delay in outputting said result by said output section in accordance with said delay time data when said simulated input program is performed; and
   an OR gate disposed between said object and said input section for ORing said input information from said object and an output of said delay element and outputting a result of said ORing as input information to said input section.

2. A programmable controller according to claim 1, further comprising:
   an input information storage section for storing input information received from said object to be controlled;
   an output result storage section which stores an operational result for controlling said object to be controlled; and
   wherein, during said simulation by said central processing unit said result of said operation by said central processing unit when said sequence program is performed is fed to said delay element so as to delay said result by a desired delay time and said delayed result is forwarded to said input information storage section as input information for said object to be controlled.

3. A programmable controller according to claim 1 wherein said input section is connected to receive a plurality of pieces of input information from said object to be controlled, a respective delay element being provided to receive respective ones of said pieces of input information, said central processing unit including means for executing said simulated input program in order to cause a respective delay element unit to set a predetermined delay time to respective input information.

4. A programmable controller comprising;
   an input section which receives input information from an object to be controlled;
   an output section which outputs an operational result for effecting control over said object to be controlled;
   a memory which stores a control program;
   a central processing unit which is connected to said input section, said output section and said memory and which operates in accordance with said control program; and
   a delay element which is connected to said central processing unit and which has a desired delay time set thereto;
   wherein during a simulation by said central processing unit, said delay element causes a result of an operation of said central processing unit to be delayed by said desired delay time and feeds said result as input information back to said central processing unit;
   wherein said memory contains a sequence program for operation control and a simulated input program, said simulated input program being executed during said simulation by said central processing unit in order to set said desired delay time to said delay element;
   wherein said input section is connected to receive a plurality of pieces of input information from said object to be controlled, a respective delay element being provided to receive respective ones of said pieces of input information, said central processing unit including means for executing said simulated input program in order to cause a respective delay element unit to set a predetermined delay time to respective input information.

5. A programmable controller comprising:
   an input section which receives input information from an object to be controlled;
   an output section which outputs an operation result for effecting control over said object to be controlled;
   a memory which stores a sequence program and a simulated input program;
   a central processing unit which is connected to said input section, said output section and said memory and which operates in accordance with said sequence program; and
   a delay element which measures time that has elapsed since said central processing unit began an operation and which feeds back to said central processing unit a result of said operation performed by said central processing unit when said elapsed time reaches a delay time set in said simulated input program of said object to be controlled;
   wherein said delay element further comprises a counter for counting time, and a storage section of storing the elapsed time counted by said counter from the time when an operational result was generated, and means for comparing the contents of said storage section during a simulation with a delay value set in said simulated input program.

6. A programmable controller comprising:
an input section for receiving input information from an object to be controlled;
a first memory for storing a system program;
a second memory for storing a sequence program and a simulated input program having delay time data set thereto;
a central processing unit connected to said input section, said first memory and said second memory for selectively performing an operation in accordance with either one of said sequence program and said simulated input program;
an output section connected to an output of said central processing unit for outputting a result of an operation performed by said central processing unit when said sequence program is performed;
a delay element connected to an output of said central processing unit for measuring time elapsed since a start of an operation by said central processing unit when said simulated input program is performed and for causing the output of said result when said elapsed time reaches a time corresponding to said delay time data set in said simulated input program for said object to be controlled.

7. A programmable controller according to claim 6 wherein said delay element further comprises a counter for counting time, and a storage section or storing the elapsed time counted by said counter from the time when an operational result was generated, and means for comparing the contents of said storage section during a simulation with a delay value set in said simulated input program.

* * * * *